United States Patent
Turner

(10) Patent No.: US 10,171,178 B2
(45) Date of Patent: Jan. 1, 2019

(54) LASER COMMUNICATION SYSTEM

(71) Applicant: Charles Michael Turner, Orlando, FL (US)

(72) Inventor: Charles Michael Turner, Orlando, FL (US)

(*) Notice: Subject to any disclaimer, the term of this patent is extended or adjusted under 35 U.S.C. 154(b) by 760 days.

(21) Appl. No.: 14/947,367

(22) Filed: Nov. 20, 2015

(65) Prior Publication Data
US 2018/0254834 A1    Sep. 6, 2018

Related U.S. Application Data

(60) Provisional application No. 62/153,979, filed on Apr. 28, 2015.

(51) Int. Cl.
| | |
|---|---|
| *H04B 10/50* | (2013.01) |
| *H04B 10/66* | (2013.01) |
| *H04B 10/70* | (2013.01) |
| *H04B 10/516* | (2013.01) |

(52) U.S. Cl.
CPC .......... *H04B 10/70* (2013.01); *H04B 10/503* (2013.01); *H04B 10/516* (2013.01); *H04B 10/66* (2013.01)

(58) Field of Classification Search
CPC .... H04B 10/503; H04B 10/516; H04B 10/66; H04B 10/70
USPC .................................................. 398/39, 182
See application file for complete search history.

(56) References Cited

U.S. PATENT DOCUMENTS

| | | | | |
|---|---|---|---|---|
| 8,995,842 | B1* | 3/2015 | Kojima | H04B 10/70 398/118 |
| 2002/0093632 | A1* | 7/2002 | Teich | G03B 27/00 355/18 |
| 2002/0182257 | A1* | 12/2002 | Shih | G03F 7/70375 424/489 |
| 2003/0098980 | A1* | 5/2003 | Dress | G02B 21/06 356/484 |
| 2008/0138087 | A1* | 6/2008 | Snyder | H04B 10/70 398/182 |
| 2008/0285046 | A1* | 11/2008 | Fullerton | G01C 19/64 356/459 |
| 2009/0317089 | A1* | 12/2009 | Peters | H04B 10/70 398/173 |
| 2012/0298878 | A1* | 11/2012 | Snyder | H04B 10/70 250/391 |

* cited by examiner

*Primary Examiner* — Amritbir K Sandhu
(74) *Attorney, Agent, or Firm* — William M. Hobby, III

(57) ABSTRACT

The present invention relates to a laser data transmission system and, more particularly, to a communication system using a plurality of laser beams populated with quantum entangled photons. At least one of the laser beams is moved to form an overlapping pattern with a second laser reference beam to form an interference pattern between the laser beams as they impinge upon a detector array to transmit encoded data and to remotely decode the encoded data simultaneously. The interference patterns are used to encode and simultaneously decode the interference shadows upon impingement of the laser beams on a detector array.

7 Claims, 2 Drawing Sheets

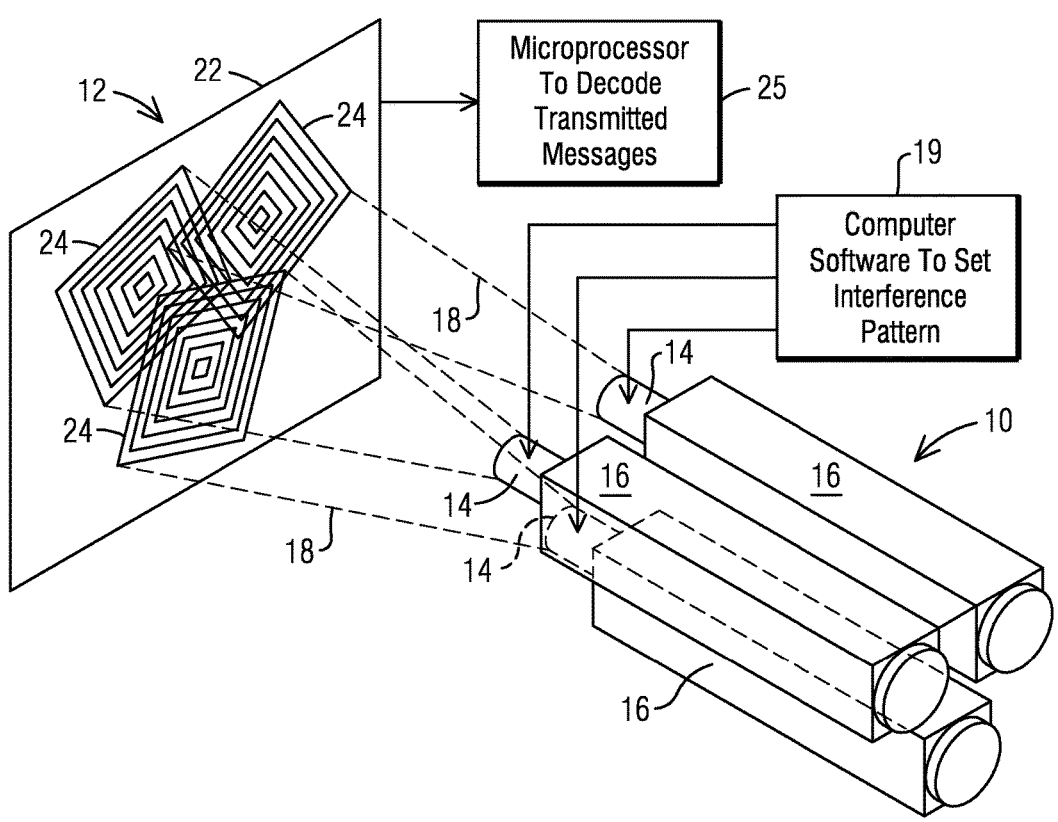

LASER COMMUNICATION SYSTEM

This application claims the benefit of provisional application Ser. No. 62/153,979, filed Apr. 28, 2015 for INSTANTANEOUS COMMUNICATION OVER DISTANCE.

FIELD OF THE INVENTION

The present invention relates to laser data transmission systems and, more particularly, to a communication system using quantum entanglement of photons in a laser light beam to encode and to remotely decode the encoded data simultaneously.

BACKGROUND OF THE INVENTION

Time delay slows the transfer of information, and time is money. Without time delays, messages would arrive the moment they are created, obviating interception of said messages. When instructions or information needs to be given quickly, there is no quicker way than instant.

The speed of light has always been a limiting factor in communication, and so when communication happens instantaneously many benefits materialize from the data transmission, such as encryption is no longer necessary because there is no physical way to intercept an instantaneously transmitted message. Stock trades, response times, any instance where improving awareness and response times can improve lives.

As can be seen, there is a need for a system for transmitting data instantaneously so that the time it takes to communicate is no longer an issue.

The present system utilizes quantum entanglement in a communication system. Quantum entanglement is when two particles, such as two photons of light, act together in an entangled system. The particles behave like one object even though they are physically apart.

SUMMARY OF THE INVENTION

The present invention relates to a laser data transmission system and, more particularly, to a communication system using a plurality of laser beams populated with quantum entangled photons. The laser beams are rotated and overlapped onto a detector array to transmit encoded data and to remotely decode the encoded data simultaneously. The interference patterns are used to encode and simultaneously decode the interference shadows upon impingement of the laser beams on a detector array.

A laser communication system has a plurality of lasers each having a laser beam generating a plurality of entangled photons therein, each laser having means, such as by a galvanometer scanner, for moving at least one laser beam emanating therefrom. A laser beam detector array is positioned for each said laser beam to impinge upon and each laser beam partially overlapping each other laser beam of the plurality of laser beams of entangled photons to create at least one interference pattern therebetween. The system has encoding means for encoding interference patterns in each laser beam of entangled photons and decoding means for decoding the encoded interference patterns between the overlapping beams of entangled photons. Data is transmitted between points of a laser beam using the interference patterns in overlapping laser beams of entangled photons of laser beams.

BRIEF DESCRIPTION OF THE DRAWINGS

The accompanying drawings, which are included to provide a further understanding of the invention and are incorporated in and constitute a part of the specification, illustrate an embodiment of the invention and together with the description serve to explain the principles of the invention.

FIG. 3 is a system schematic of an alternative exemplary embodiment of the laser communication system of FIG. 1 creating another interference patterns.

DETAILED DESCRIPTION OF AN EXEMPLARY EMBODIMENT

The following detailed description is of the best currently contemplated modes of carrying out exemplary embodiments of the invention. The description is not to be taken in a limiting sense, but is made merely for the purpose of illustrating the general principles of the present invention.

Broadly, an embodiment of the present invention provides a data transmission system for transmitting data instantaneously. The data transmission system may include one or more laser light beams generating apparatus at point A (10) and a laser light beam detection system at point B (12) detecting interference patterns. The generated laser light beam may be scanned continuously using a laser scanner or by rotating and moving each laser and transmitting at least one interference pattern so that a coding device at point A (10) encodes the data by establishing an interference pattern from point A (10) to point B (12) using at least one interference pattern, whereby the laser light beam detection system decodes the encoded data at point B (12).

Figure 1:
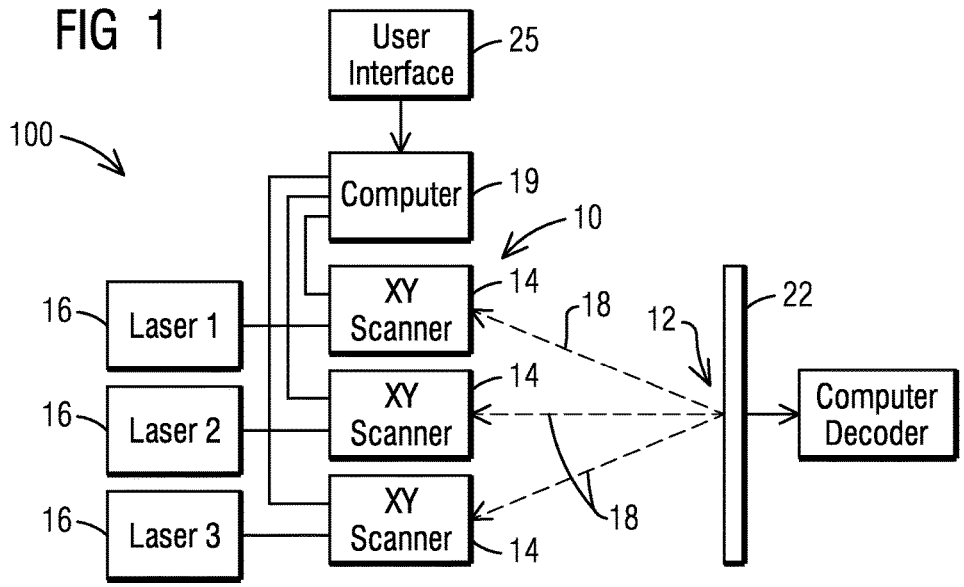
FIG. 1 is a block diagram of an exemplary embodiment of a laser communication system in accordance with the present invention.
Figure 2:
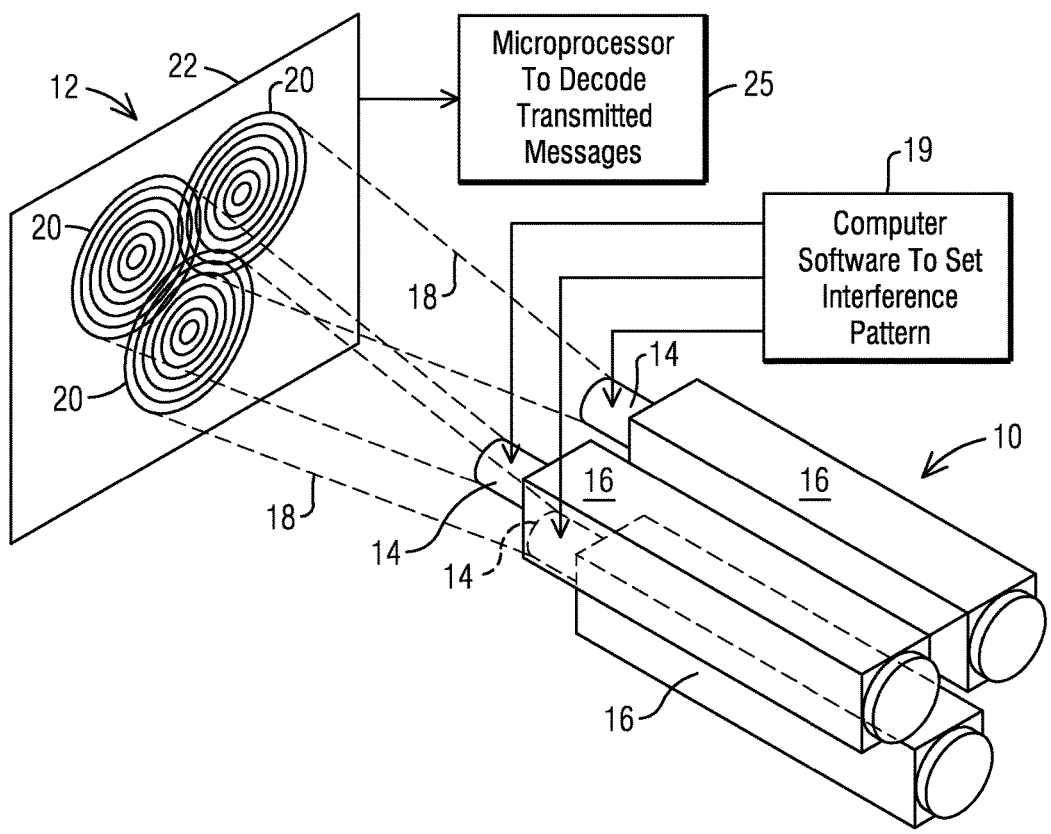
FIG. 2 is a system schematic of the laser communication system of FIG. 1 creating interference patterns.

Referring now to FIGS. 1 through 3, the present invention may include a data transmission system 100 that embodies a method for transmitting data from a point A (10) to a point B (12) instantaneously. The data transmission system 100 may include a laser light beam generating apparatus 16, such as a continuous wave (CW) laser at a point A (10) and a laser light beam detection array 22 at point B (12). Each laser beam is scanned with a laser scanner 14. The scanning may be by rotating or forming a pattern with the laser beam emanating therefrom to encode the data being transmitted. The laser beam may be rotated or scanned to form a pattern 20 or 24 with an x-y galvanometer scanner or other type of scanner 14 which encodes the laser beams 18. The scanning may also be accomplished by rotating and moving each laser 16. Each laser beam scanner 14 is controlled by the computer 19 to form three continuous overlapping laser beams.

The laser light beam generating apparatus 16 may be adapted to generate a single laser or multiple laser light beams 18 that interact by rotation or interactive scanned movement from point A (10) to point B (12) which will establish at least one interference pattern 20 (FIG. 2) or 24 (FIG. 3) along its length with minimal distortion. The laser light beams 18 may include, but are not limited to, all electromagnetic beams that travel at the speed of light. The at least one interference pattern 20 or 24 may include circular, rectangular and any geometric or non-geometric pattern that function in accordance with the present invention as described herein.

A continuously generated laser beam from each continuous wave (CW) laser has a concentration of photons which are quantum entangled in the beam from one end to the other. The entire laser beam is entangled without separating the individual photons and then using pre-set interference patterns that are generated at point A (10) and show up at point B (12). The instantaneous data transfer is accomplished by the continuously generated beams being manipulated at point A (10). The beam has no inertia, no mass and no resistance to change. Manipulating the beams interference patterns with respect to each other at point A (10) will move the beams instantly throughout the length of the beam.

The encoded interference patterns are decoded in the microprocessor or for decoding transmitted messages 25.

In certain embodiments, each laser 16 generated light beam 18 is populated with entangled photons which are concentrated in the laser light beams 18 so that the physical space with the generated monopole gravitational waves of space are in turn being concentrated so as to manipulate the field of generated space itself by manipulating the laser light beams 18. Pursuant to a relevant equation Space=Energy (m×c^2)×C^3, or the resulting decay of mass to Space (the gravitational field)=the amount before the decay(Mass) times the expanding three dimensional radius (speed of light) cubed. E=M×C^2 is a two dimensional surface decay but it is traveling upon a three dimensional decay. An increase in Space expansion=Energy×C^3, which is missing between the quantum world and the world of relativity. Space expands as mass decays but it is a surface decay from the potential energy of photons (energy) decaying at the dipoles, creating the structure of quantum entanglement for quadrillions of photons in a beam that acts as a solid structure to itself and therefore carries the interference patterns with a connected flow of generated photons from one end to the other with a single laser and creates interference with multiple beams at point B (12) that can be instantly manipulated at point A (10) due to the photon's outlining the shadows to form the outline of the underlying self-sustaining structure of consistent fixed interference patterns outlining space from the beam generating end to point B (12). By creating interference patterns in one laser or by integrating interference patterns from multiple lasers, the data is transferred by encoding the information at or near the area near the beam generator. The transfer of information is accomplished by moving the laser or lasers thereby moving the interference patterns instantaneously at point B (12).

Each laser light beam generating apparatus 16 may provide a scanner 14 used to encode data. Each scanner 14 may be adapted to encode the data to be transferred by rotating or moving the laser beam at point A creating at least one interference pattern 20 or 24 by a predetermined degree, respectively. As a result, the moving or rotating discrepancies (difference is degrees of rotation, for example) among separate interference patterns 20 or 24 can be made into many types of data codes, as illustrated in FIGS. 2 and 3, which can be "decoded" at point B (12).

The laser light beam detector array 22 may include at least one computer 19 with a user interface 25. The computer may include any processing unit with a form of memory including, but not limited to, a desktop, laptop, and smart device, such as a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like. The software application program may be adapted to detect the movement or rotation of the laser light beams 18 and "decode" their attendant interference patterns 20 or 24 and so translate the data incorporated therein.

As a result, the laser light beams 18 are connected between point A and point B so the incorporated data can be sent and received at the same moment in time instantaneously. The signal is input through an encoder and then transmitted by the entangled photons of the laser beam. The laser beams may include a reference beam which is intersected with one or more moving beams. The encoded interference pattern impinging upon a sensor array can then be read by the computer at the receiving end. The encoded data moves at least one laser beam containing the encoding of the interference by driving a scanner, such as a galvanometer scanner, to move the beam to create the interference pattern containing the encoded data.

A method of using the present invention may include the following. A user may provide the data transmission system 100 disclosed above. By creating codes with a laser beam scanner or by rotating and moving lasers, one or more of which can be a static reference beam, with respect to the beam itself, interference patterns 20 or 24 can be used to transmit complex data for the benefit of scientific exploration, military and national security, banking, quantum computing, astrophysics with NASA, tracking rocket silo movement instantly from space with a feedback system (modified beam profiler system to detect disturbances in the continuously generated laser field), improving the speed of all forms of satellite to satellite communication, quantum computing, instantaneous 3D holographic communications, any form of information transfer or communication, such as talking to someone on Mars someday without a time delay.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the present invention.

I claim:

1. A laser communication system comprising;
a plurality of lasers each having a laser beam populated by a plurality of entangled photons, at least one of said plurality of lasers having a laser scanner for moving said at least one laser beam emanating therefrom;
a laser beam detector array positioned for each said laser beam to impinge thereupon, each of the laser beams partially overlapping each other laser beam of said plurality of laser beams of entangled photons to create at least one interference pattern therebetween;
an encoding computer for encoding the interference patterns between at least two of said plurality of intersecting laser beams; and
a decoding computer for decoding the encoded interference patterns of said at least two of said plurality of overlapping laser beams impinging upon said laser beam detector array;
whereby data can be transmitted between points of a laser beam using the interference patterns in overlapping laser beams of entangled photons.

2. The laser communication system in accordance with claim 1 in which each of said plurality of lasers is a continuous wave laser.

3. The laser communication system in accordance with claim 2 having three lasers.

4. The laser communication system in accordance with claim 2 in which at least one of said lasers has a scanning laser beam and at least one of said plurality of lasers output beams is fixed.

5. The laser communication system in accordance with claim 1 in which at least one scanning laser beam is scanned with a galvanometer scanner.

6. The laser communication system in accordance with claim 1 in which at least one of said laser beams is scanned by rotating and moving said at least one laser.

7. The laser communication system in accordance with claim 1 in which each said scanning laser beam is scanned with a rotating mirror.

* * * * *